United States Patent
Sakuragi

(10) Patent No.: US 10,651,704 B2
(45) Date of Patent: May 12, 2020

(54) ROTATING DEVICE

(71) Applicant: MINEBEA MITSUMI INC., Nagano (JP)

(72) Inventor: Katsunori Sakuragi, Yonago (JP)

(73) Assignee: MINEBEA MITSUMI INC., Nagano (JP)

( * ) Notice: Subject to any disclaimer, the term of this patent is extended or adjusted under 35 U.S.C. 154(b) by 209 days.

(21) Appl. No.: 15/483,330

(22) Filed: Apr. 10, 2017

(65) Prior Publication Data

US 2017/0302127 A1    Oct. 19, 2017

(30) Foreign Application Priority Data

Apr. 15, 2016   (JP) ................................ 2016-082241

(51) Int. Cl.
| | |
|---|---|
| *H02K 5/22* | (2006.01) |
| *H02K 11/33* | (2016.01) |
| *H02K 5/04* | (2006.01) |
| *H02K 5/15* | (2006.01) |

(52) U.S. Cl.
CPC ................ *H02K 5/22* (2013.01); *H02K 5/04* (2013.01); *H02K 5/15* (2013.01); *H02K 11/33* (2016.01)

(58) Field of Classification Search
CPC . H02K 5/22; H02K 11/33; H02K 5/04; H02K 5/15
USPC ........................................................ 310/89
See application file for complete search history.

(56) References Cited

U.S. PATENT DOCUMENTS

| | | | | |
|---|---|---|---|---|
| 2011/0169358 A1* | 7/2011 | Furukawa | .............. | H02K 3/522 310/89 |
| 2011/0304225 A1 | 12/2011 | Terashita et al. | | |
| 2012/0043862 A1* | 2/2012 | Furukawa | .............. | H02K 1/278 310/68 B |
| 2012/0326538 A1* | 12/2012 | Yoshida | ................... | H02K 5/08 310/43 |
| 2013/0136633 A1* | 5/2013 | Kanda | ..................... | F04D 13/06 417/410.1 |
| 2014/0152142 A1* | 6/2014 | Terashita | ................. | H02K 5/04 310/216.113 |

(Continued)

FOREIGN PATENT DOCUMENTS

| | | |
|---|---|---|
| CN | 102130526 A | 7/2011 |
| CN | 102280986 A | 12/2011 |

(Continued)

OTHER PUBLICATIONS

Jun. 18, 2019 Office Action issued in Japanese Patent Application No. 2016-082241.

(Continued)

*Primary Examiner* — Alex W Mok
(74) *Attorney, Agent, or Firm* — Oliff PLC

(57) ABSTRACT

A rotating device has a housing having an opening portion opened to one side in a rotor axis direction, a rotor accommodated in the housing, a substrate coupling to the opening portion, and a cover covering a part of the substrate, and a snap portion and a loop portion are provided on an end portion, in the housing, forming the opening portion and are arranged in a radial direction. The substrate has an engaged portion engaging with the snap portion, and the cover has an engaged portion engaging with the loop portion.

5 Claims, 5 Drawing Sheets

(56) References Cited

U.S. PATENT DOCUMENTS

| | | | | |
|---|---|---|---|---|
| 2015/0008783 A1* | 1/2015 | Kitaji | H02K 3/34 | 310/215 |
| 2015/0008784 A1* | 1/2015 | Kitaji | H02K 3/34 | 310/215 |
| 2015/0008803 A1* | 1/2015 | Furukawa | H02K 3/34 | 310/68 D |
| 2015/0069864 A1* | 3/2015 | Nagahama | H02K 29/08 | 310/50 |
| 2015/0311766 A1* | 10/2015 | Matsuda | H02K 29/08 | 417/423.7 |
| 2015/0311769 A1* | 10/2015 | Sawada | H02K 29/08 | 310/51 |
| 2015/0381017 A1* | 12/2015 | Kitaji | H02K 1/2733 | 310/68 B |
| 2016/0013697 A1* | 1/2016 | Haga | H02K 5/04 | 310/71 |

FOREIGN PATENT DOCUMENTS

| | | |
|---|---|---|
| EP | 1914843 A1 | 4/2008 |
| JP | S63-12025 U | 1/1988 |
| JP | H01-116566 U | 8/1989 |
| JP | 2000-324744 A | 11/2000 |
| JP | 2008-99392 A | 4/2008 |
| JP | 2012-125024 A | 6/2012 |
| JP | 2013099094 A * | 5/2013 |
| JP | 2015-211558 A | 11/2015 |

OTHER PUBLICATIONS

Nov. 12, 2019 Decision to Grant a Patent issued in Japanese Patent Application No. 2016-082241.

Sep. 3, 2019 Office Action issued in Chinese Patent Application No. 201710238912.6.

* cited by examiner

ROTATING DEVICE

CROSS REFERENCE TO RELATED APPLICATIONS

This application claims the benefit of Japanese Patent Application No. 2016-082241, filed Apr. 15, 2016, which is hereby incorporated by reference in its entirety.

BACKGROUND

Technical Field

The present disclosure relates to a rotating device and particularly relates to a rotating device having a substrate in which at least a part thereof is covered by a cover.

Background

Many rotating devices are used as a driving source in office equipment and home electric appliances, for example. Some of the rotating devices have substrates. For example, some of the substrates are driving circuits for driving the rotating device and others have detection portions for detecting a rotating operation of the rotating device mounted on its substrate.

FIG. 5 is a side sectional view of a conventional rotating device.

In FIG. 5, an example of a rotating device 801 having a circuit substrate on which a driving circuit is attached is illustrated, for example.

The rotating device 801 has a housing 820, a substrate 850, and a cover 860 of the rotating device 801. The rotating device 801 is an inner rotor-type brushless motor. A magnet 815 is attached to a rotor axis 810 of the rotating device 801, and the rotor axis 810 is rotatable with respect to the housing 820.

The substrate 850 is a circuit substrate on which a driving circuit of the rotating device 801 is attached. The substrate 850 is attached in a vicinity (vicinity of an end portion on a right side in the figure) of one of end portions of the housing 820. In the substrate 850, a surface on a side (right side in the figure) opposite to a side where the housing 820 is attached is covered and protected by a cover having a bowl shape opened toward the substrate 850. The cover 860 is fixed to the substrate 850 by engagement of an opening end portion 860a of the cover 860 with a fixing portion provided on the surface on the cover 860 side of the substrate 850.

Japanese Patent Application Laid-Open No. 2012-125024 discloses a structure of a gear housing incorporating a speed reduction portion in a motor outputting power via the speed reducing portion. In this structure, the gear housing is constituted by combining a first gear housing and a second gear housing. The second gear housing is fixed to the first gear housing by snap-fit engagement between a locking projecting portion formed on an outer side surface of the first gear housing and a locking claw formed on an outer peripheral edge portion of the second gear housing.

In the structure as illustrated in FIG. 5 above, a certain degree of a dimension (a dimension w0 in FIG. 7) in an axial direction from the substrate 850 to an end portion of the cover 860 is needed in order to fix the cover 860 to the substrate 850. Thus, there is a problem that the dimension in a rotor axis direction of the rotating device 801 becomes longer.

The present disclosure has an object of handling such a problem. That is, the present disclosure is related to providing a rotating device which can reduce a dimension in the rotor axis direction.

SUMMARY

A rotating device may include a housing including an opening portion opened to one side in a direction of a rotor axis, a rotor accommodated in the housing, a substrate coupling to the opening portion, and a cover covering a part of the substrate. In the housing, a snap portion and a loop portion are provided on an end portion forming the opening portion and are arranged in a radial direction. The substrate may have an engaged portion engaging with the snap portion, and the cover may have an engaging portion engaging with the loop portion.

It may be so configured that the housing has an insulator, and the snap portion and the loop portion are provided at the insulator.

It may be so configured that the substrate has a recess portion recessed in the radial direction, the recess portion is the engaged portion. The snap portion and the loop portion are arranged on an inner side of the recess portion in the radial direction.

It may be so configured that the housing has a plurality pairs of the snap portion and the loop portion, and the plurality of pairs of the snap portion and the loop portion are arranged at positions different from each other in a circumferential direction.

It may be so configured that the rotating device may include a housing having an opening portion opened to one side in a direction of a rotor axis, a rotor accommodated in the housing, a substrate coupling to the opening portion, and a cover covering a part of the substrate. In the housing, a first engagement portion and a second engagement portion may be provided on an end portion forming the opening portion and are arranged in a radial direction, the substrate may have an engaged portion engaging with the first engagement portion, and the cover may have an engaged portion engaging with the second engagement portion.

It may be so configured that the second engagement portion has a recess portion recessed in the radial direction, and the engaged portion of the cover is a projecting portion protruding toward the second engagement portion.

According to the aforementioned disclosure, the rotating device which can reduce a dimension in the rotor axis direction can be provided.

DETAILED DESCRIPTION

A rotating device in an embodiment of the present disclosure will be described below.

In the present embodiment, a rotating device (motor) is a so-called inner-rotor type brushless motor. The motor has a circuit substrate. On the circuit substrate, a driving circuit of the motor is mounted.

Embodiment

Figure 1:
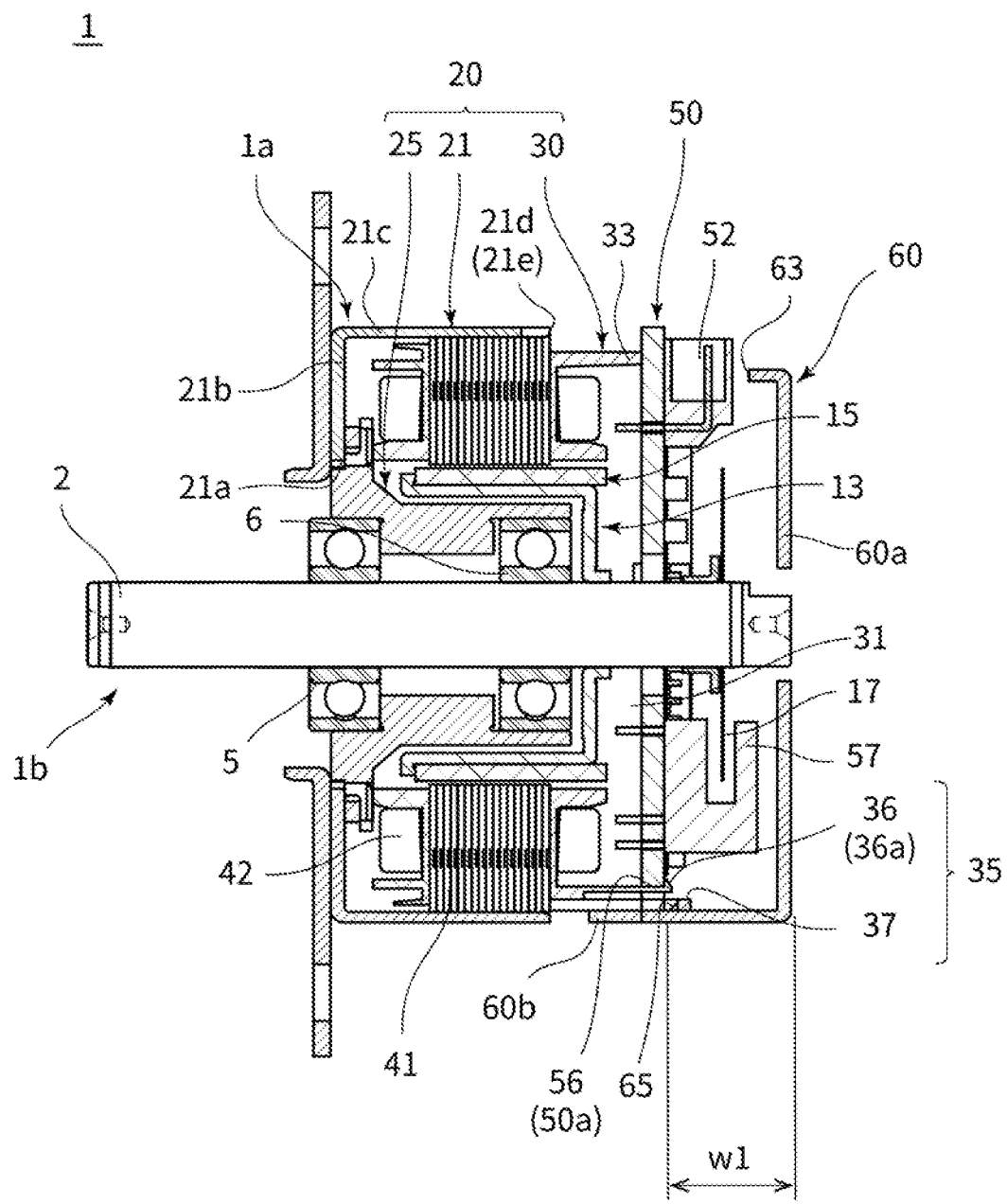
FIG. 1 is a side sectional view illustrating a motor in an embodiment of the present disclosure.

FIG. 1 is a side sectional view illustrating the motor 1 in the embodiment of the present disclosure.

Figure 5:
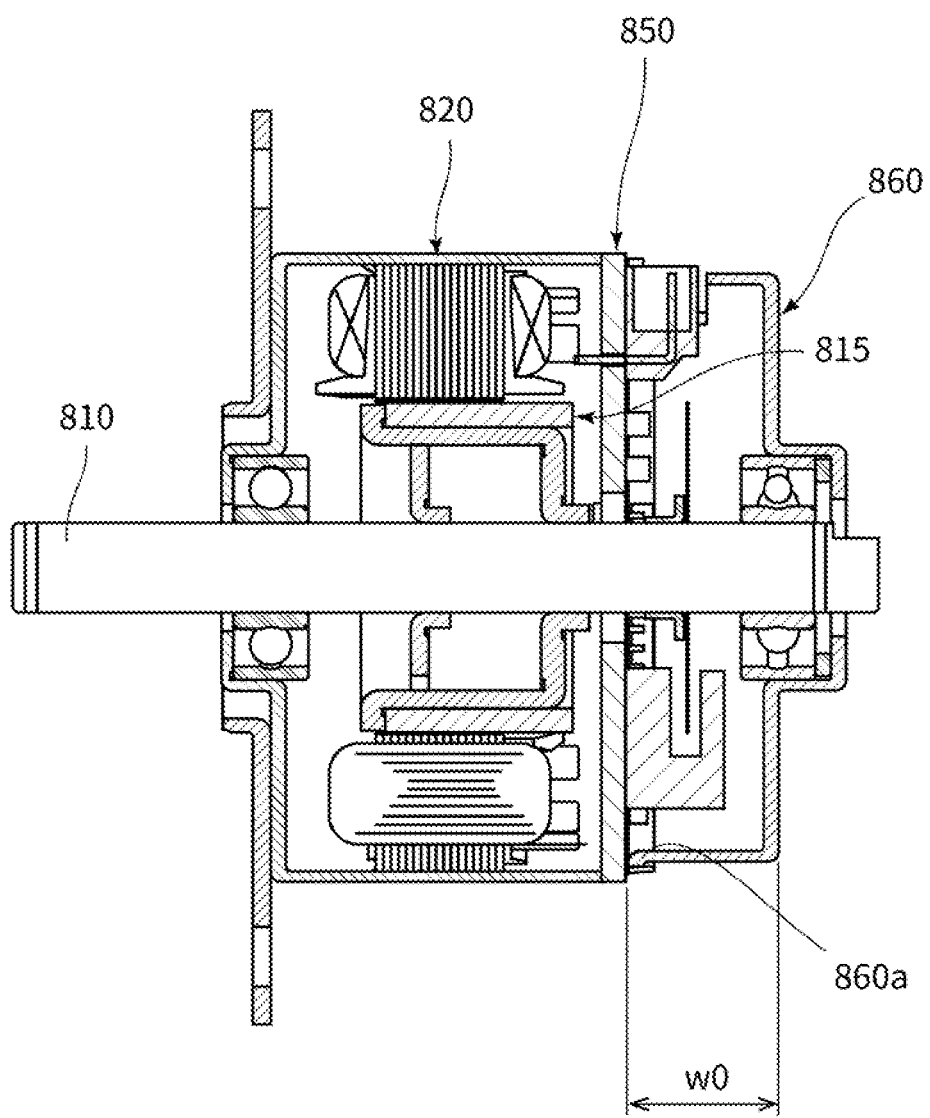
FIG. 5 is a side sectional view of a conventional rotating device.

In the following description, a right-and-left direction (longitudinal direction of a rotor axis 2) in FIG. 1 is called an axial direction or a rotor axis direction in some cases. Particularly, a left direction in FIG. 1 (a direction on a side where a housing 20 is arranged with respect to a substrate 50) is called a front, while a right direction (a direction on a side where a cover 60 is arranged with respect to the substrate 50) is called a rear in some cases (terms "front" or "rear" in expressions such as a front, a rear, a front side, a rear side, a front end portion, a rear end portion and the like are also similar to that). Moreover, a direction getting closer to or a direction separating away from the rotor axis 2 is called a radial direction in some cases. A direction around the rotor axis 2 (a rotating direction of the motor 1) is called a circumferential direction in some cases. Moreover, a left direction in FIGS. 1 and 5 is called an output shaft side, while a right direction in FIGS. 1 and 5 is called a non-output shaft side in some cases.

As illustrated in FIG. 1, the rotating device (hereinafter, also referred to as a motor in some cases) 1 roughly has a columnar shaped frame assembling body 1a, a rotor 1b supported rotatably around the rotor axis 2 with respect to the frame assembling body 1a, the substrate 50, and the cover 60. In the present embodiment, the motor 1 is a so-called inner-rotor type brushless motor. The motor 1 is not limited to the present embodiment but may be an outer-rotor type motor, an inner-rotor type motor with brush, an outer-rotor type motor with brush and the like.

The rotor 1b has a rotor axis (shaft) 2, a rotor housing 13, and a magnet 15. On a rear of the rotor axis 2, a substrate 17 for encoder is attached.

The rotor housing 13 is fixed to the rotor axis 2. The rotor housing 13 has a bowl shape open toward the front.

The magnet 15 is formed annularly and is fixed to an outer peripheral surface of the rotor housing 13. An outer peripheral portion of the magnet 15 is magnetized so that different magnetic poles are aligned in a circumferential direction.

On the rear of the rotor axis 2, an encoder 37 which will be described later is provided, and FIG. 1 illustrates a substrate used for the encoder 37. The encoder 37 includes a sensor of a hole element, a light receiving element and the like, not shown. When the hole element is used as a sensor, a magnet is provided on the substrate 17 for encoder, while when the light-receiving element is used as the sensor, a slit through which light passes is provided in the substrate 17 for encoder. Moreover, the encoder 37 may include a brush, a power feeding portion. In this case, a wiring to be in contact with a brush is formed on the substrate 17 for encoder.

The frame assembling body 1a is constituted by the housing 20, a core 41, and a coil 42 and the like.

The housing 20 is to accommodate a member constituting the motor 1 (e.g.: the rotor 1b and the like). In the present embodiment, the housing 20 is constituted by a case 21 and a bearing holder 25 and an insulator 30. The constitution of the housing 20 is not limited to the present embodiment. The case 21 for accommodating the magnet 15 may be handled as the housing or the insulator 30 for accommodating the core 41 may be handled as the housing, for example.

The insulator 30 constitutes a stator having a roughly tubular shape, together with the core 41 and the coil 42. The insulator 30 is formed with a resin member having insulation. Moreover, the insulator 30 is a member having an annular planar shape. The core 41 is a silicon steel sheet or a plate formed with a ferromagnetic body (a steel sheet, for example) and has a protruding portion protruding toward the rotor axis 2 in the radial direction. This protruding portion becomes a magnetic pole portion by contact of the magnet 15 with the core 41 and is a so-called salient pole portion. The stator has a plurality of salient pole portions aligned in the circumferential direction, and the coil 42 is wound around each of the salient pole portions. When an electric current flows through the coil 42 in order to drive the motor 1, each of the salient pole portions is excited, and the rotor axis 2 is rotated.

At a center part of the insulator 30 in the radial direction, a space where the rotor 1b and the bearing holder 25 are arranged is provided. That is, the insulator 30 has an opening portion 31 opened to the rear.

In the vicinity of the opening portion 31 of the insulator 30 (that is, in the vicinity of a rear end portion of the insulator 30), an end portion 33 protruding to the rear is formed. A plane shape of the end portion 33 is annular. An inner side of the end portion 33 is the opening portion 31. In other words, the end portion 33 forms the opening portion 31. On a part of the end portion 33, a fixing portion 35 forming a pair of a snap portion 36 and a loop portion 37 is provided. The fixing portion 35 fixes the cover 60 and the substrate 50 to the insulator 30 as will be described later.

The case 21 has a tubular shape. A portion of the case 21 on the front side of the case 21 is closed. The rotor axis 2 protrudes from a center part of the case 21 on the front side. Specifically, the case 21 includes a front surface 21b having an opening portion 21a, a tubular portion 21c, and a rear surface 21e having an opening portion 21d. The opening portion 21a of the front surface 21b is formed smaller than the opening portion 21d of the rear surface 21e. The opening portions 21a and 21d of the front surface 21b and the rear surface 21e are formed with inner peripheral portions of the front surface 21b and the rear surface 21e. The case 21 is formed with using a metal member such as a metal plate or the like or a resin member such as ABS or the like, for example.

As described above, the end portion of the case 21 on the rear side is the opening portion 21d. Inside the case 21, the stator including the insulator 30 is arranged. The end portion 33 of the insulator 30 on the rear side and a portion having the fixing portion 35 engaged with the cover 60 as will be described later are arranged on the rear of the opening portion 21d of the case 21. That is, in the present embodiment, the opening portion 31 of the insulator 30 is an opening portion of the housing 20.

The bearing holder 25 is arranged at a center part on the front side of the case 21. The bearing holder 25 has a roughly tubular shape in which a space through which the rotor axis 2 penetrates is provided at the center part in the radial direction. The bearing holder 25 is a member formed with die-cast or a resin or the like, for example. Bearings 5 and 6 are fitted in and fixed to each of the vicinity of a front end portion and a vicinity of a rear end portion of the bearing holder 25. The rotor axis 2 is rotatably fixed (press-fit in the present embodiment) to the bearings 5 and 6. The rotor axis 2 is held by the bearings 5 and 6 at two spots rotatably with respect to the housing 20.

The magnet 15 and the tubular portion of the rotor housing 13 supporting the magnet 15 are arranged in a space between an outer peripheral surface of the bearing holder 25 and an inner peripheral portion of the core 41. The bearing 6 is arranged on an inner side of the rotor housing 13. Since the bearing 6 arranged on a rear side with respect to the bearing 5 can be arranged on a front side from the substrate 50, a dimension of the motor 1 in a front-and-rear direction can be made smaller than the case where the bearing 6 is arranged on the rear side with respect to the substrate 50.

The substrate 50 is coupled to the opening portion on the rear of the housing 20 (that is, the opening portion 31 of the insulator 30). Specifically, the substrate 50 is attached in the vicinity of the end portion 33 of the insulator 30. The substrate 50 in the present embodiment is a circuit substrate, on the circuit substrate a driving circuit of the rotating device 1 is attached. The substrate 50 has a plate shape. A planar shape of the substrate 50 is a substantially circular. Constitution of the substrate 50 is not limited to the present embodiment but may be a substrate on which a plurality of wirings are formed or a substrate closing the opening portion of the housing 20.

On the substrate 50, a connector portion 52 connected to an external device, an encoder 57 for grasping a rotating state of the motor 1, and other circuit elements are mounted. The connector portion 52 is a connector portion for receiving an input signal from a driver circuit for driving the motor 1 or an external control circuit and transmitting an output signal to the external control circuit. The encoder 57 detects a rotation number and a rotating direction of the motor 1 and feeds back a detection result to the external control circuit. These circuit elements and the like are mounted mainly on a surface on the rear side of the substrate 50. Moreover, the substrate 50 is connected to each of the coils 42. The substrate 50 electrically conducts the coil 42, rotates the rotor 1b, and drives the motor 1 when an input signal transmitted from the external control circuit is input to the substrate 50 through the connector portion 52.

The cover 60 has a roughly bowl shape having an opening portion opened to the front. Specifically, it has a tubular shape having a bottom portion. The opening portion of the cover 60 is formed with an annular end portion (front end portion). A surface of the cover 60 on the rear side becomes a bottom portion 60a. A tubular portion 60b having an annular plane shape extending from the bottom portion 60a to the front is provided on the front side of the bottom portion 60a. The cover 60 is arranged on the rear of the substrate 50 and is arranged so as to cover the entire surface on the rear side of the substrate 50. As a result, the driving circuit and an electronic component on the substrate 50 are protected.

In the tubular portion 60b of the cover 60, a projecting portion 65 is formed. The projecting portion 65 is a cover-side engagement portion to be engaged with the insulator 30 as will be described later. The projecting portion 65 is formed so as to protrude from a surface on an inner side of the tubular portion 60b in a radial direction. The projecting portion 65 is formed so as to protrude toward the loop portion 37 of the fixing portion 35.

In the tubular portion 60b of the cover 60, an opening portion 63 is formed in a portion where the connector portion 52 is provided. The connector portion 52 is exposed to an outside of the cover 60 through the opening portion 63. As a result, a harness or the like for connection to the external device can be connected to the connector portion 52.

Figure 2:
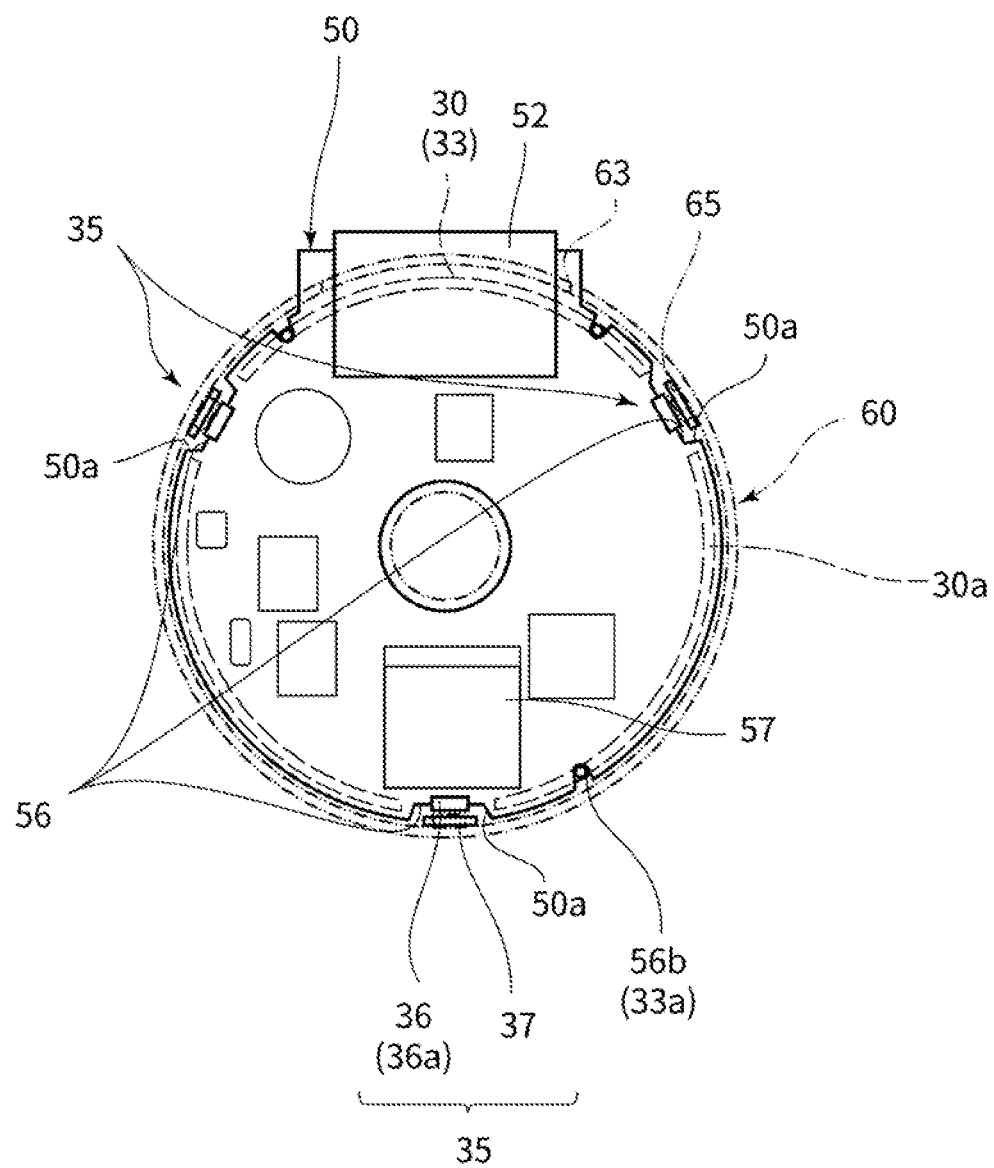
FIG. 2 is a side view of a cover side of the motor.

FIG. 2 is a side view of the cover side (rear side) of the motor 1.

In FIG. 2, the substrate 50 is indicated by a solid line for explanation, and the cover 60 is indicated by a two-dot chain line. Moreover, a part of the insulator 30 hidden by the substrate 50 and which should not have appeared on the rear side is indicated by a broken line.

As illustrated in FIG. 2, a recess portion 56 recessed in the radial direction from an outer peripheral edge portion is formed in the substrate 50. In the present embodiment, the recess portions 56 are formed at three spots in the substrate 50. The recess portions 56 at the three spots are arranged so as to be aligned at a substantially equal interval (so as to have an interval of approximately 120 degrees in a circumferential direction around the rotor axis 2) in the circumferential direction of the substrate 50.

Moreover, in the substrate 50, positioning portions 56b are formed at three spots. The positioning portion 56b is formed from an outer peripheral edge portion of the substrate 50 so as to cut out a part of the substrate 50. That is, a planar shape of the positioning portion 56b is a recess portion recessed to an inner side from the outer peripheral edge portion of the substrate 50. A position of the positioning portion 56b corresponds to a position of a projection (hereinafter called a positioning projection) 33a formed on the insulator 30. The positioning projection 33a is fitted in the positioning portion 56b so that the substrate 50 is arranged on the insulator 30. As a result, the substrate 50 enters a positioned state so that the substrate 50 does not rotate around the rotor axis 2 with respect to the insulator.

In the present embodiment, the fixing portions 35 are formed at three spots. The fixing portions 35 at the three spots are arranged at positions different from each other in the circumferential direction of the substrate 50. The fixing portions 35 at the three spots are aligned at a substantially equal interval with an interval of approximately 120 degrees in the circumferential direction around the rotor axis 2. The fixing portion 35 and the recess portion 56 are provided at positions corresponding to each other.

The end portion 33 of the insulator 30 is formed so as to form a substantially annular shape, excluding a portion where the fixing portion 35 is provided, when seen from the substrate 50 side.

Figure 3:
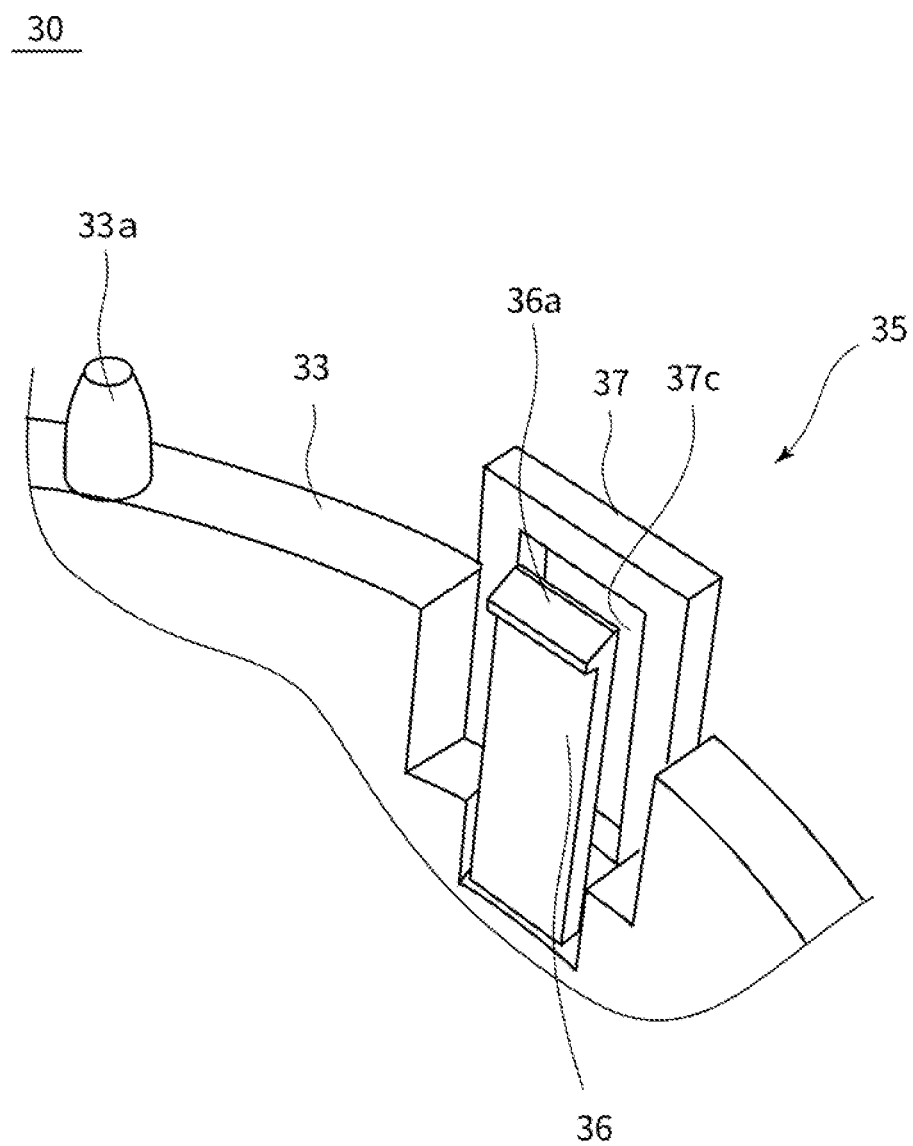
FIG. 3 is an enlarged perspective view illustrating a structure in a vicinity of an opening end portion of an insulator.

FIG. 3 is an enlarged perspective view illustrating a structure of a vicinity of the end portion 33 of the insulator 30.

In FIG. 3, a portion where one of the three fixing portions 35 is provided is illustrated. As illustrated in FIG. 3, the positioning projection 33a has a pin shape protruding from an end surface of the end portion 33. The shape of the positioning projection 33a is not limited to that.

In the present embodiment, the fixing portion 35 includes two engagement portions, that is, the snap portion 36 and the loop portion 37. The snap portion 36 and the loop portion 37 are provided on the rear end portion 30a of the insulator 30 by being juxtaposed in the radial direction. In the present embodiment, the snap portion 36 and the loop portion 37 are a part of the insulator 30.

The snap portion 36 is formed so as to be engaged with the substrate 50 by snap-fit. The snap portion 36 has flexibility. The snap portion 36 protrudes in the axial direction from the insulator 30 side toward the cover 60 side (directed to the rear). As a result, a distal end portion of the snap portion 36 on the cover 60 side is easily displaced in the radial direction. In other words, the snap portion 36 is formed in a cantilever state such that the insulator 30 side (front side) is a fixed end portion joined to an insulator 30 body, while the distal end portion on the cover 60 side is a free end.

A claw portion 36a is formed on a portion in the vicinity of the distal end portion of the snap portion 36 on the cover 60 side. The claw portion 36a is formed so as to protrude toward an inner side in the radial direction. That is, the claw portion 36a is provided so as to protrude toward the substrate 50.

The loop portion 37 is formed so as to be engaged with the cover 60 by snap-fit. The loop portion 37 has flexibility. The loop portion 37 protrudes in the axial direction from the insulator 30 side toward the cover 60 side (directed to the rear). As a result, a distal end portion of the loop portion 37 on the cover 60 side is easily displaced in the radial direction. In other words, the loop portion 37 is formed in a cantilever state such that the insulator 30 side (front side) is a fixed end joined to an insulator 30 body, while the distal end portion on the cover 60 side is a free end.

The loop portion 37 has a loop shape such that a through hole 37c is formed when seen in the radial direction. That is, it can be considered that the loop portion 37 has a portion recessed in the radial direction (engagement recess portion) when seen from the outer periphery side. A recess portion having one surface not penetrating in the radial direction may be formed instead of the through hole 37c.

As illustrated in FIG. 2, the snap portion 36 and the loop portion 37 are arranged on an inner side of the recess portion 56 when seen from the axial direction. Since the snap portion 36 and the loop portion 37 are arranged on the inner side of the recess portion 56, the dimension of the motor 1 in the radial direction can be made smaller. It may be so constituted that only the snap portion 36 is arranged on the inner side of the recess portion 56.

As illustrated in FIG. 1, the substrate 50 includes an engaged portion 50a to be engaged with the snap portion 36. The engaged portion 50a is an end edge portion of the recess portion 56. The claw portion 36a of the snap portion 36 is engaged with the engaged portion 50a. The substrate 50 is attached to the housing 20 in a state where the engaged portion 50a is engaged with the snap portion 36. That is, in the substrate 50, the surface on the front side contacts with the end portion 33 of the insulator 30, and the end edge portions of the recess portions 56 at the three spots on an outer peripheral portion becomes engaged with the claw portions 36a of the snap portion 36. Thus, the substrate 50 is in a state fixed to the insulator 30.

Moreover, the cover 60 includes an engaged portion to be engaged with the loop portion 37. In the present embodiment, the engaged portion is the projecting portion 65. The cover 60 is attached to the housing 20 in a state where the projecting portion 65 is engaged with the loop portion 37. For example, the projecting portion 65 is fitted in the loop portion 37 in a state where the front end portion of the tubular portion 60b contacts with a part of the housing 20. As a result, the cover 60 is in a state fixed to the insulator 30.

Figure 4:
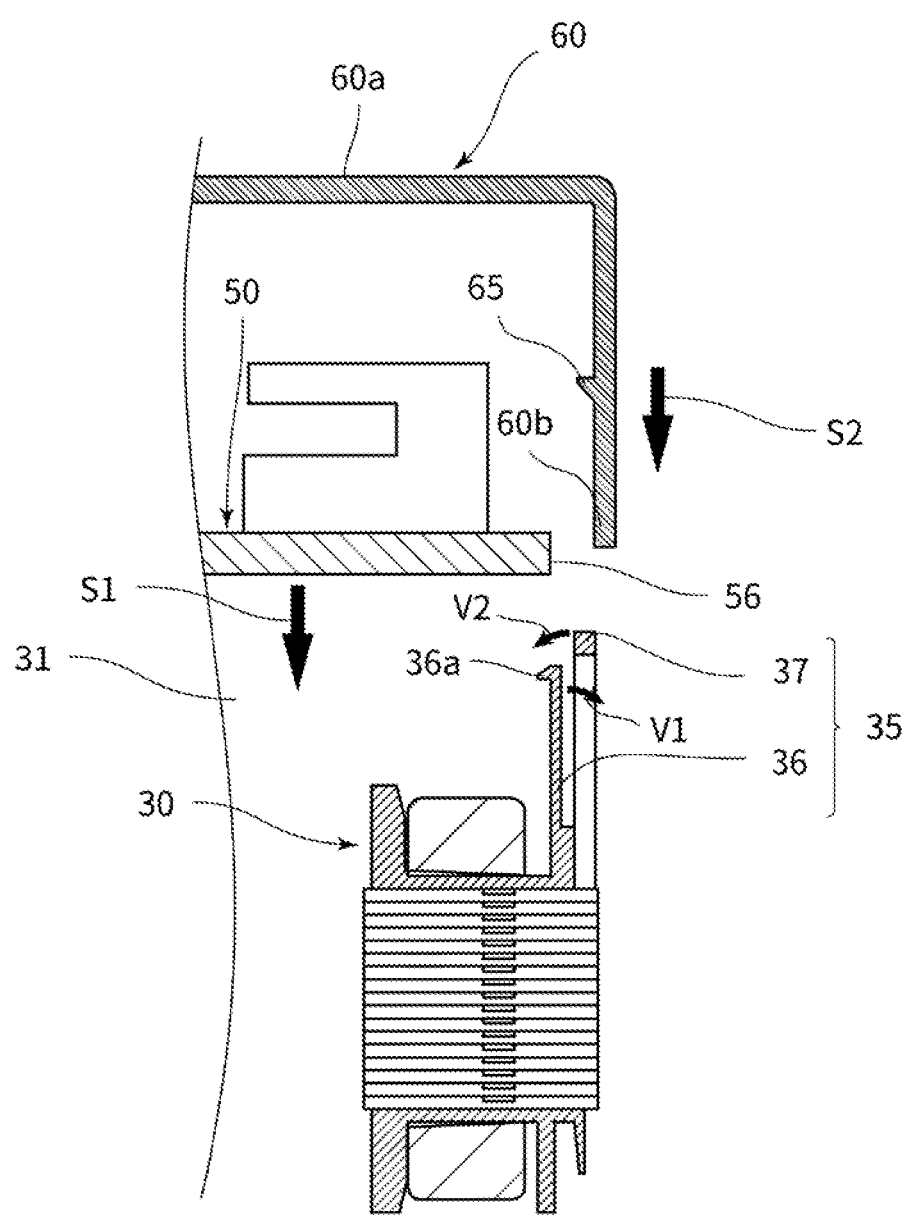
FIG. 4 is a view for explaining an attaching structure of a substrate and the cover to the insulator.

FIG. 4 is a view for explaining an attaching structure of the substrate 50 and the cover 60 on the insulator 30.

In FIG. 4, the attaching structure is illustrated so that the axial direction is a vertical direction.

The substrate 50 and the insulator 30 are engaged with each other by snap-fit as follows. That is, the substrate 50 is pressed toward (an arrow S1) the opening portion 31 of the insulator 30 on a lower portion (toward the front) from the rear (an upper side in the figure). Then, the end edge portion of the recess portion 56 of the substrate 50 enters a state in contact with the rear end portion of the claw portion 36a.

The rear end portion of the claw portion 36a has an inclined surface inclined so that the surface is arranged gradually further on the front side as the surface gets closer to the inner side in the radial direction. When the substrate 50 is pressed to the front in a state where the end edge portion of the substrate 50 is in contact with the inclined surface as above, the snap portion 36 is deflected, and the rear end portion of the snap portion 36 is displaced to the outer side in the radial direction (an arrow V1). Then, the substrate 50 is pushed to the front until it is supported by the end portion 33, the claw portion 36a becomes engageable with the end edge portion of the substrate 50, and deflection of the snap portion 36 restores to the original. As described above, the snap portion 36 is engaged with the substrate 50 by snap-fit, and the substrate 50 is fixed to the insulator 30.

The cover 60 and the insulator 30 are engaged with each other by snap-fit as follows. That is, the cover 60 is pressed toward the front from the rear (an arrow S2). Then, the projecting portion 65 of the cover 60 enters a state in contact with the rear end portion of the loop portion 37.

Here, the end surface on the front side of the projecting portion 65 has the inclined surface inclined so that the surface is arranged gradually further on the rear side as the surface gets closer to the inner side in the radial direction. When the cover 60 is pressed to the front in a state where the rear end portion of the loop portion 37 is in contact with such inclined surface, the loop portion 37 is deflected, and the rear end portion of the loop portion 37 is displaced to the inner side in the radial direction (an arrow V2). When the cover 60 is further pressed, the projecting portion 65 becomes engageable with the loop portion 37, and the deflection of the loop portion 37 restores to the original. As described above, since the projecting portion 65 is engaged with the loop portion 37 by snap-fit, the cover 60 is attached to the insulator 30 so as not to remove from the insulator 30.

In the motor 1 constituted as above, the cover 60 is fitted in and attached to the insulator 30 on the housing 20 side. An attaching position of the cover 60 can be set regardless of the position of the substrate 50. Thus, since the cover 60 can be arranged on the front as compared with the case where the cover 60 is fixed to the substrate 50, the dimension from the substrate 50 to the bottom portion 60a of the cover 60 (a dimension w1 in FIG. 1) can be made as small as possible. Therefore, the dimension of the motor 1 in the rotor axis direction can be made smaller.

Moreover, the substrate 50 and the cover 60 are attached by snap-fit. Therefore, the substrate 50 and the cover 60 can be attached easily on the housing 20, and a manufacturing cost of the motor 1 can be kept low. Each of the substrate 50 and the cover 60 is attached to the housing 20 at the three spots. Therefore, attaching strength of the substrate 50 and the cover 60 can be improved.

In the present embodiment, the projecting portion 65 is formed on the cover 60, and the loop portion 37 is formed in the insulator 30 on the housing 20 side. Thus, as compared with the case where the loop portion 37 is provided on the cover 60 side, the dimension of the cover 60 in the axial direction can be made smaller. Therefore, the dimension from the substrate 50 to the bottom portion 60a of the cover 60 can be easily made smaller.

The snap portion 36 and the loop portion 37 are formed so that the snap portion 36 and the loop portion 37 arranged (lined) in the radial direction. Thus, when the insulator 30 is to be shaped by a resin, shaping can be performed easily.

[Others]

A motor combining the constitution of the aforementioned embodiment as appropriate may be constituted.

The substrate is not limited to a circuit substrate on which a driving circuit of a motor is mounted. The substrate may be a circuit substrate on which another circuit is mounted or may be a plate-shaped member arranged for another purpose, not a circuit substrate.

The cover may be anything as long as the cover is arranged so as to cover at least a part of the substrate. Moreover, it may be so constituted that the tubular portion of the cover is formed so as to be deflected easily, and mainly the cover side is deflected and is engaged by snap-fit with the engagement portion provided on the housing side. Alternatively, the loop portion and the engagement recess portion are formed on the cover side, and the projecting portion to be fitted therein may be formed on the housing side.

The recess portion does not have to be provided in the substrate. The snap portion only needs to be engaged with the outer peripheral edge of the substrate. Moreover, it may be so constituted that a hole portion is formed in the substrate, and the substrate is fixed to the housing when the snap portion penetrates the substrate and is engaged with the end edge portion of the hole portion. The shape of the snap portion is not limited to those having a claw portion provided at the distal end portion as above.

The snap portion and the loop portion do not have to be arranged (lined) in the radial direction and may be provided at positions different from each other in the circumferential direction of the insulator. The numbers of the snap portions and the loop portions may be plural, respectively. Moreover, by making one pair of the one snap portion and the one loop portion, the number of the pairs is not limited to three but may be two or four or more. Moreover, the number of the snap portions may be different from the number of the loop portions. Only one snap portion and one loop portion may be provided.

The insulator may be arranged completely inside the case. In this case, the cover may be attached to the case by engaging the engagement portion on the cover side with the engagement portion such as the loop portion or the like formed on a portion in the vicinity of the end portion of the opening portion of the case. Moreover, the substrate may be fixed to the case by being engaged with the snap portion formed at a portion in the vicinity of the end portion of the opening portion of the case.

The motor is not limited to a brushless inner-rotor type motor as described above but may be other types of motor in which the substrate is attached to the housing.

In the aforementioned embodiment, the plane shape of the tubular portion of the cover is circular but this is not limiting, and the plane shape may be a track shape or a rectangle shape such as a square shape or the like as long as it is tube shaped.

In the aforementioned embodiment, the two engagement portions, that is, the snap portion and the loop portion are included in the fixing portion, but this is not limiting, and the fixing portion may include either one of the snap portion and the loop portion.

In the aforementioned embodiment, the snap portion and the loop portion are provided as a part of the insulator but this is not limiting. They may be provided on the housing by forming the snap portion or the loop portion by a member separate from the insulator and attaching it to the insulator.

The aforementioned embodiment is exemplification in all the points and should not be considered to be limiting. A range of the present disclosure is indicated not by the aforementioned description but by claims and is intended to include all the changes with the meaning and within the range equivalent to claims.

What is claimed is:

1. A rotating device comprising:
a housing including an opening portion opened to a first side in a direction of a rotating axis, and an insulator having a snap portion and a loop portion having a through-hole extending entirely through the loop portion in the radial direction, the through-hole of the loop portion and the snap portion being aligned in the radial direction;
a rotor accommodated in the housing;
a core located in the insulator of the housing;
a substrate coupled to the opening portion, the substrate having an engaged portion engaging with the snap portion; and
a cover covering a part of the substrate, the cover having an engaged portion engaging with the loop portion.

2. The rotating device according to claim 1, wherein:
the substrate has a recess portion recessed in the radial direction, the recess portion includes the engaged portion; and
the snap portion and the loop portion are arranged on an inner side of the recess portion in the radial direction.

3. The rotating device according to claim 1, wherein:
the insulator has a plurality pairs of the snap portion and the loop portion; and
the plurality of pairs of the snap portion and the loop portion are arranged at positions different from each other in a circumferential direction.

4. A rotating device comprising:
a housing including an insulator having a first engagement portion and a second engagement portion having a through-hole extending entirely through the second engagement portion in the radial direction, the through-hole of the second engagement portion and the first engagement portion being aligned in the radial direction;
a rotor accommodated in the housing;
a core located in the insulator of the housing;
a substrate coupled to an opening portion of the housing, the substrate having an engaged portion engaging with the first engagement portion; and
a cover covering a part of the substrate, the cover having an engaged portion engaging with the second engagement portion.

5. The rotating device according to claim 4, wherein:
the engaged portion of the cover includes a projecting portion protruding toward the second engagement portion.

* * * * *